Sept. 6, 1938.　　　　J. H. TAYLOR　　　　2,129,107
POWER TRANSMISSION MECHANISM
Filed March 28, 1936　　2 Sheets—Sheet 1
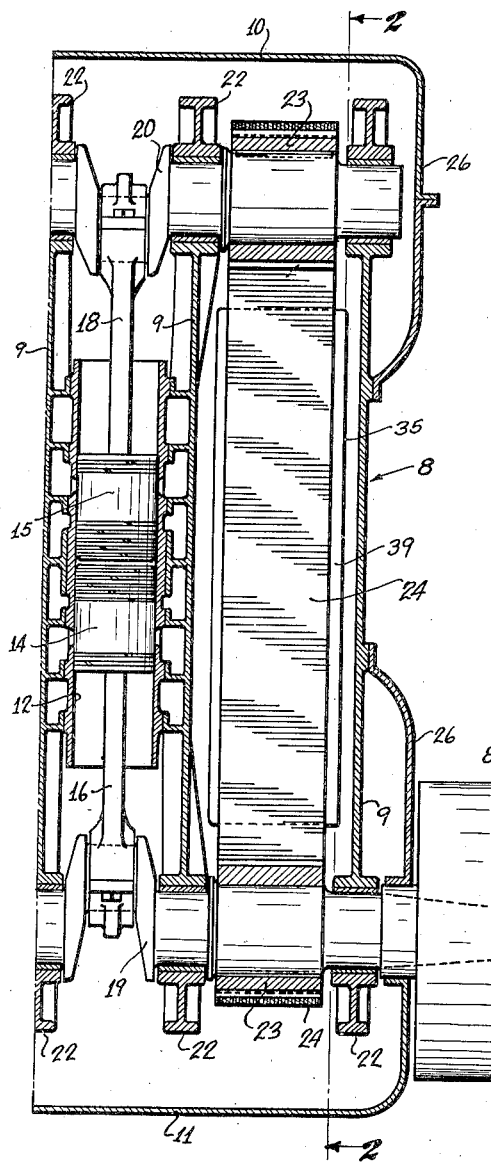
INVENTOR.
JAMES H. TAYLOR
BY
ATTORNEY.

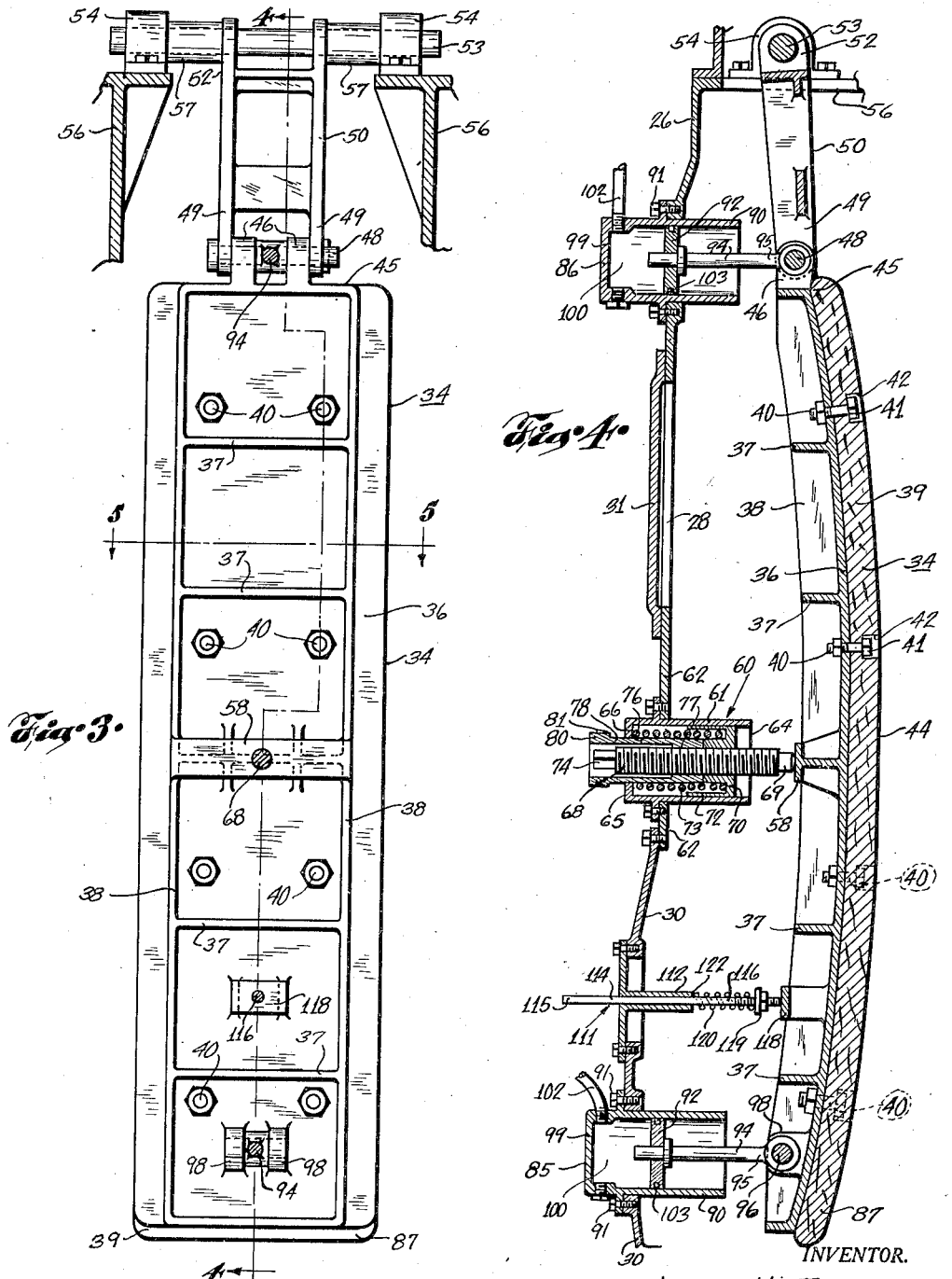

Patented Sept. 6, 1938

2,129,107

UNITED STATES PATENT OFFICE 2,129,107

POWER TRANSMISSION MECHANISM

James H. Taylor, Hamilton, Ohio, assignor to Fairbanks, Morse & Co., Chicago, Ill., a corporation of Illinois Application March 28, 1936, Serial No. 71,367

10 Claims. (Cl. 74—242.11)

This invention relates to improvements in power transmission mechanisms and more particularly to an improved chain drive assembly including means for automatically regulating the tension of the chain and for maintaining a symmetrical configuration of the chain under all conditions of operation of the drive.

The chain drive mechanism of the present invention is shown by way of a preferred example of its application, as embodied in the organization of a reversible, opposed-piston Diesel engine of two cycle type. In an engine of this type having upper and lower crankshaft assemblies, the two crankshafts are generally operatively associated by a suitable means providing a positive connection therebetween, in order to synchronize the operation of the shafts and to maintain through such synchronization of shaft operation, the phase relation of the opposed pistons connected to the shafts. The presently improved chain drive mechanism while providing for the usual power transmission connection between the engine crankshafts, is particularly suitable for maintaining synchronous operation and phase relation of the two crankshafts and connected pistons. It is to be understood, however, that the present invention may be applied with equal facility to other types of internal combustion engines or to other apparatus requiring a power transmission between driving and driven members, or between a combination of driving or driven members.

Accordingly, an object is found in the provision in an improved chain drive mechanism, of chain-tensioning apparatus adapted for automatic regulation of chain tension. The apparatus includes chain engaging members or so-called chain shoes and mechanism of fluid-pressure operated type adapted for positioning the shoes relative to the chain. In the present example, the engine lubricating system may provide the source of fluid under pressure for effecting actuation of the chain shoe positioning mechanism.

A further object is attained in the provision of improved chain tensioning mechanism including one or more chain shoes or slipper members, in which the shoe is pivotally supported near one of its ends so that it may be most effectively positioned relative to the chain. The shoe is arranged to bear against the outward or external side of the chain and is pivotally supported near one end by a link member to a portion of the engine frame, the shoe being suspended in a full-floating pivotal manner. The shoe is adapted to be positively and yieldably positioned relative to the chain by fluid pressure or hydraulically operated apparatus of cylinder and piston type, the arrangement being such that the force exerted by the apparatus upon the shoe is uniformly distributed over the shoe. Lateral movement of the shoe away from the chain is resisted by the action of the hydraulic apparatus, in that the apparatus provides for a yieldable counteracting force which is created by the oil enclosed in the cylinder, the oil being slowly forced out of the cylinder and back into the engine lubrication system as a result of the outward pressure of the chain and chain shoe upon the piston of the hydraulic apparatus.

Another object will appear in the provision in an improved chain drive mechanism of the type described, of a chain shoe formed of non-metallic and metallic elements. The metallic member is, by preference, formed in a manner to absorb substantially all the operating and adjusting stresses of the chain shoe; while the non-metallic element, being that part of the shoe structure which frictionally engages the chain, is subjected only to minimum pressure stresses resulting from the outward thrust of the chain. The non-metallic element of the shoe is associated with the metallic element thereof so as to be readily and easily replaceable. However, since the pressure stresses on this element, resulting from chain engagement are very slight, face wear will be practically negligible, hence the necessity for replacement of this element of the shoe may be of infrequent occurrence.

An additional object is found in the provision of a floating chain shoe structure which is provided with a mechanical stop device for limiting movement of the shoe in a direction outwardly of or away from the chain. The outward movement of the shoe is resisted by a resilient mechanism forming a part of the stop, the mechanism exerting a force on the shoe increasing in magnitude with the increase in outward movement of the shoe until the mechanical stop is attained. The mechanical stop device is fully adjustable whereby the degree of outward lateral movement of the shoe may be controlled to obtain the most favorable and efficient chain performance for any given condition of engine operation.

A further object is attained in the provision in the improved drive mechanism described, of a fully enclosed oil-sealed casing or housing therefor. The housing may be formed as a part of the engine casing to provide for compactness of assembly of the engine organization. In the present example, the chain drive is by preference, located at the flywheel end of the engine. A further feature of the drive mechanism is found in the provision of a spring-regulated gauge of stem type having one end of the stem bearing upon the outward side of the chain shoe and its opposite or indicating end extending through the housing wall. The stem indicates by lateral displacement fluctuations thereof, the extent and frequency of whip or vibration of the chain. Also, the stem indicator provides an indication of the degree of chain wear or stretch as well as chain load or tension. Thus the operative condition of the chain may be positively ascertained externally of the sealed housing during all conditions of engine operation.

A still further object is found in the provision, in an improved chain drive mechanism of the type described, of a housing therefor which is adapted to permit of ready and easy accessibility to the entire chain drive system. For this purpose, suitably arranged openings or hand-holes and oil-sealed cover plates therefor are provided on the housing, permitting a ready and convenient approach to all elements of the chain drive. Certain of the openings are arranged to allow a removal of the chain shoe from the lower portion of the engine structure, thereby providing for a minimum servicing clearance above the engine. In certain engine installations where the servicing space above the engine is at a premium, as in marine installations, the present provision for removing the chain shoe from the lower portion of the engine organization enables the engine organization to be installed in limited quarters.

An additional object is provided for in an improved chain shoe structure which has a large effective operating length. In the present example of its application to the chain drive of an opposed piston engine, the shoe occupies a position intermediate the crankshaft gear members and is of such length as substantially to cover the length of the chain between the gears, thereby effecting a minimum unit bearing pressure between the shoe and chain. Thus the shoe may effect a maximum control and regulation of the chain tension. Since the shoe ends are in close proximity to the gears, the degree of chain engagement or chain wrap about the chain sprockets may be substantially increased to provide for a more effective drive connection between the chain and sprockets. In the present chain drive organization, undue chain stresses are eliminated and efficient gear operation is attained.

A still further object is found in the compact and simple construction of the improved chain drive organization. The parts embodied throughout the drive may be machined and assembled at a reasonable cost. Also, the lubrication system of the engine preferably serves as the source of lubrication for the drive whereby clean oil is fed to the chain drive at all times during its operation. The improved chain drive organization is, therefore, not only completely and efficiently lubricated, but is also fully enclosed and most advantageously embodied within the engine organization.

Yet another object is found in the provision in the improved chain drive mechanism, of a pair of chain shoes, one thereof engaging one side of the chain loop and the other shoe engaging the other side of the chain. The chain shoes which are similar in design and are regulated by similar control mechanism, are symmetrically positioned with respect to the chain sides and between the chain sprockets, thus providing for a symmetrical chain configuration which is uniformly maintained, irrespective of the direction of chain travel. It will be readily understood, therefore that a predetermined phase relation of the engine crankshafts will be maintained in either forward or reverse operation of the engine, without requiring any additional chain or shaft adjustment apparatus.

Further objects and advantages of the present invention will appear from the following detailed description of structure and operation and from the accompanying drawings in which:

Fig. 1 is a longitudinal sectional elevation of one end portion of an opposed-piston engine structure, showing the engine crankshafts operatively connected by a chain drive; Fig. 2 is a transverse section of the engine as taken along line 2—2 in Fig. 1, showing the chain drive and improved chain tensioning mechanism embodying the features of the present invention; Fig. 3 is an enlarged elevational view of the chain shoe structure forming a part of the chain tensioning mechanism, the view being taken along line 3—3 in Fig. 2; Fig. 4 is a sectional elevation of the shoe structure and associated regulating mechanism, as viewed along a staggered plane identified with line 4—4 in Fig. 3, and Fig. 5 is a cross-section of the chain shoe, as taken along line 5—5 in Fig. 3.

Referring to Fig. 1 of the drawings by suitable numerals of reference, 8 designates generally an engine organization of the type hereinbefore described. The engine includes an engine frame structure 9, engine top cover or casing 10 and crankcase 11, a cylinder 12 and a pair of pistons 14 and 15 therein, arranged in opposed relation. The pistons 14 and 15 are connected, respectively, by connecting rods 16 and 18 with crankshafts 19 and 20, one or both of which are provided with suitable power take off means not shown in detail. The crankshafts are suitably journalled in bearings 22 carried by the engine frame 9. Each crankshaft carries a sprocket or gear 23 operatively connected thereto, the crankshafts and sprockets being operatively interconnected by a chain drive 24 which is, by preference, of so-called silent type.

It will be noted from Figs. 1 and 2 that the engine cover or casing 10 and crankcase 11 are extended to provide a completely oil-tight housing 26 for the chain drive mechanism, the side walls of the housing being provided with suitably spaced openings or hand-holes 27 and 28 and removable, oil-tight cover plates 30 and 31 respectively, for the openings. Also, the upper portion 32 of the housing 26 is adapted for ready removal. Removal of housing portion 32 and cover plates 30 and 31 permit ready access to the chain drive mechanism later to be described in detail. The sprockets or gears 23 and chain 24 may be lubricated in any suitable manner, as by utilizing the force-feed lubrication system of the engine, only certain parts of which are shown, to deliver oil to these members.

The chain 24 in operative engagement with the gears 23, serves as a power drive connection and phase maintenance means between the crankshafts 19 and 20. The chain is by preference of one of the usual silent types having a flat outer face adapted to receive in frictional engagement therewith chain tensioning shoes. The initial assembly of the chain 24 in operative association with the sprockets 23 on the engine crankshafts 19 and 20 may be readily and easily effected in the usual manner evident from an observation of Figs. 1 and 2. It will be noticed in this connection that the chain is of a length appreciably exceeding that required for an operative connection of the sprockets. It is common practice in the assembly and operation of opposed piston engines of the type described to provide for a slight lead of one piston, connecting rod and associated crankshaft assembly relative to the other such assembly, so that there results a slight phase displacement of the cranks of one crankshaft relative to the cranks of the other crankshaft. This phase relation between the two crankshafts and sprockets is, in the present example, maintained by the chain and sprocket connection and by the chain tensioning mechanism operating on the chain in such a manner as to effect a uniform chain tension and curved configuration of the chain, whereby to maintain the crankshaft phase relation irrespective of reversals in engine rotation. The phase relation of the sprockets as maintained by the chain is within an angular range less than is indicated by the difference in chain length required for the curved configuration thereof and a symmetrical straight line chain configuration. After many hours of service, the chain may become so worn and lengthened or stretched that the automatic action of the chain tensioning mechanism in regulating the chain tension, may become ineffective in the adjustment of the chain. This condition may be overcome by the substitution of a section of hunting or offset links for a section of the original links. This practice is common and serves to prolong the life and usefulness of a chain whereby to reduce the cost and frequency of complete chain replacements.

Proceeding now with a description of the chain tensioning mechanism, the mechanism includes chain shoes or slipper elements 34 and 35 positioned on the outer sides of the chain over portions thereof intermediate the crankshaft sprockets 23, the shoes being arranged in symmetrical relation with respect to the axial plane of the chain drive. Since the chain shoe structures are or may be similar in every respect, only one thereof, say the shoe 34, will be described in detail, the same reference characters applying equally to both shoe structures. The shoe 34 is, by preference, comprised of a light, welded steel or cast aluminum member 36 provided with transverse strengthening ribs or flanges 37 suitably spaced along the member, together with longitudinal ribs or flanges 38 and a non-metallic member 39 of wood or other material secured to the member 36 by suitable fastening means, such as the screws or bolts 40 (Figs. 3 and 4). The member 39 serves as the chain-engaging element of the shoe, while the member 36 provides a metallic backing for the element 39, serving to strengthen the shoe structure and to absorb the operating stresses of the shoe structure in regulating chain tension. It will be noted in Fig. 4 that the head portions 41 of the bolts 40 are disposed in recesses or countersunk portions 42 in the chain engaging face 44 of the shoe element 39 to prevent obstruction of the chain in passing over the shoe face 44. Also, it will be noted from an inspection of Figs. 1 and 2, that the longitudinal extent of the shoe element 39 and its metallic backing 36 is substantially coextensive with the length or passes of a chain between the sprocket elements 23, and that the assembled shoe is of substantially concavo-convex aspect to adapt the shoe for a substantially complete overall engagement with those portions of the chain operating off the sprockets.

The shoe structure 34 is pivotally suspended near its upper end 45 in a manner now to be described. The metallic element 36 is provided near the shoe end 45 with a pair of spaced, upstanding lugs 46 which pivotally engage a pin element 48 journalled in arms 49 of a supporting frame or suspension arm 50. The frame 50 is, in turn, pivotally supported on its upper end 52 upon a pivot pin 53 suitably journalled in bearing members 54 carried by bracket members 55 which may be formed as a part of the engine frame 9. Suitable sleeve elements 57 may be provided on the pin 53 as a means for positioning the frame 50 along the pin. The described pivotal support of the shoe structure 34 provides for a floating shoe, in which the shoe may be not only pivotally actuated about the pivot 48, but laterally displaced relative to the chain 24 by reason of the pivoted frame 50.

The chain shoe or slipper is provided intermediate the ends of the metallic element 36, with a laterally extending abutment member 58 arranged for engagement with an element of a stop device 60 provided for limiting lateral or outward movement of the shoe away from the chain (Fig. 4). The device 60 comprises a cylinder 61 extending through and supported by a wall portion 62 of the chain drive housing 26, the inner end 64 of the cylinder being open while the outer end 65 is provided with an inturned flange 66. Disposed centrally of and extending through the cylinder is a threaded member 68 having its inner end 69 in engagement with the shoe abutment 58. Threadedly engaging the member 68 is a cup-shaped or flanged element 70, the flanged portion 72 of which is adapted for slidable engagement with the inner wall surface of the cylinder, in the manner of a piston, the member 70 serving to support the member 68 within the cylinder. Disposed between the cup-shaped flange 72 of member 70 and the flange 65 of cylinder 61 is a compression spring 73 acting to urge the member 68 against the shoe abutment 58. Thus the spring and associated elements serve to provide a limited yieldable stop for controlling movement of the shoe laterally of and away from the chain 24, such movement of the shoe and hence the member 68, effecting a compression of the spring until the spring coils mechanically engage each other throughout the spring extent, whereupon the stop device provides a positive mechanical stop for the shoe.

The stop member 68 may be adjustably positioned relative to the shoe member 58 by longitudinal displacement of the member 68. For this purpose the outer or free end 74 of member 68 is formed to provide a hexagonal or other form of head for operative engagement with a suitable tool (not shown). A lock device 76 provided for the element 70 comprises a threaded portion 77 engaging the member 68 adjacent the element 70 and a sleeve portion 78 extending through the cylinder flanged portion 66. The free end 80 of the sleeve portion 78 is adapted for connection with a suitable operating tool (not shown) by which the locking device 76 may be actuated to locking engagement with the element 70. Also, it will be noted that the end 80 of sleeve 78 provides a shouldered portion 81 which may serve to limit the movement of the member 68 inwardly of the cylinder, as by engagement of the portion 81 with the cylinder flanged portion 66. In effecting adjustments of the stop device, the locking member 76 is released from locking engagement with element 70 and the member 68 actuated to a desired position relative to the shoe member 58, whereupon, the lock 76 may be again actuated to locking engagement with the member 70.

As a means for yieldably urging the shoe structure 34 against the chain 24, a pair of hydraulically operated devices 85 and 86 are operatively associated with the shoe, the device 85 being disposed near the lower end 87 of the shoe while the device 86 is located near the upper end 45 of the shoe. Since the two devices 85 and 86 are similar in structure and operation, only one of them, say 85, will be described in detail, the same reference characters applying equally to each. The device 85 comprises a cylinder 90 which extends through the cover plate 30 of the chain drive casing 26, and is secured to the cover as by the fastening means or bolts 91. Operatively associated with the cylinder 90 is a piston 92 having a piston rod 94, the free end 95 of which is pivotally connected to a pin element 96 carried by suitable bearing elements 98 on the shoe member 36. The cylinder 90 is closed near its outer end, as by the wall 99, thereby providing a cylinder chamber 100. An oil conduit 102 having a connection with the engine lubricating system (not shown) serves to conduct oil from the system to the cylinder chamber 100 so that the piston 92 is subjected to the fluid pressure of the system. Admission of oil to the chamber 100, under the pressure existing in the engine lubrication system, provides an actuating force on the piston tending to move the piston outwardly of the cylinder and acting through the piston rod 94, to urge the shoe against the chain 24. In order to minimize leakage of oil by the piston 92, the piston may be provided with one or more rings or sealing elements 103, as shown in Fig. 4.

In the operation of the device 85, the force exerted upon the piston in urging the shoe against the chain, whereby to maintain the tension of the chain, is determined by the substantially uniform pressure of the engine lubricating system. In the present example, the device 85 is so proportioned that the oil pressure of the engine oiling system in acting upon the piston 92, is sufficient to maintain the shoe in tension regulating engagement with the chain drive, during normal operation of the engine. However, should the tensional force of the chain, tending to move the shoe outwardly or toward the wall of the housing 26, become so great as to exceed the oil pressure on the piston 92, the chain will tend, in acting through the shoe 34 and connecting rod 94, to force the piston inwardly of the cylinder. The oil in the cylinder chamber provides a yieldable counter-force to the force of the chain, acting after the manner of a dashpot as well as a shoe impelling agency, the oil being forced, in response to excess pressure on the shoe, back into the lubrication system through the conduit 102. The ratio of piston area to cylinder oil inlet area is such that the oil in the chamber 100 is forced out very slowly, so that there cannot be any sudden change in the tensioning action of the shoe upon the chain. Thus the hydraulic device 85 provides a yieldable pressure upon the chain shoe, tending to maintain a uniform chain tension at all times, irrespective of wear.

The hydraulic device 86 at the upper end of the shoe is similar in structure and operation to that of the device 85, with the exception that the piston rod 94 is pivotally connected on its free end 95 to the shoe pivot pin 48, the connection being made, by preference, between the shoe pivot lugs 46, as shown in Figs. 3 and 4. Thus yieldable forces of substantially the same magnitude are applied to both end portions of the shoe structure, these forces acting on the shoe independently of its position of operative engagement with the chain, to cause the shoe to tension the chain. The pivotal mounting of the shoe structure in cooperation with the yieldable forces applied thereto permit the shoe freely to assume any favorable operative position relative to the chain. Moreover, by reason of the rigid metallic backing member 36 for the chain engaging element 34 of the shoe structure and the above described pressure-operated devices 85 and 86 acting on the shoe, the chain tensioning forces applied to the shoe by these devices will be substantially uniformly distributed over the member 36 and hence the complete shoe structure. Also, the uniform distribution of these forces is effected independently of the operative position of the shoe.

The shoe structure 35 engaging the opposite side of the chain 24 and which is similar in every respect to the shoe 34 is, likewise, provided with a shoe stop device 107 and hydraulic shoe positioning mechanisms 108 and 110. The device 107 and mechanisms 108 and 110 are or may be similar in structure and operation, and in operative association with the shoe 35, to the respective devices 60, 85 and 86 associated with shoe 34. Thus as will readily appear from the showing of Fig. 2, the chain shoes 34 and 35, together with the shoe controlling mechanism above described, are symmetrically arranged with respect to the chain drive 24, and in their effect upon the chain provide for a uniform chain tensioning and symmetrical chain configuration.

As a means for indicating externally of the engine and chain drive housing the extent and frequency of chain whip and vibrations thereof, as well as the extent of chain wear or stretch and chain load or tension, an indicating device 111 is associated with each of the chain shoes 34 and 35. Each of the devices 111 comprises a removable sleeve member 112 secured to and extending through a portion of the cover plate 30. The sleeve serves as an assembly guide for a reciprocable rod 114 having an indicating stem portion 115 extending outwardly beyond the cover 30. The inner end 116 of the rod is adapted to abut a lug 118 provided on the shoe member 36 (Fig. 4), and carries an adjustable nut and washer assembly 119. A compression spring 120 is arranged about the rod 114, between the nut assembly 119 and the inner end 122 of the sleeve 112, the spring serving to urge the rod end 116 against the shoe lug 118. Thus displacement of the shoes resulting from the operation of the chain drive and the hydraulic devices 85, 86, 108 and 110, will be indicated by corresponding reciprocal movement of the stem 115.

When embodied in an engine of the type described, the shoe length may approximate as much as one-half of the overall height of the engine structure. It is thus evident that removal of either of the shoes 34 and 35 through the top of the engine casing in the usual manner would require an overhead clearance much greater than is necessary for the removal of the engine piston and connecting rod structures. To obviate this condition, the removal of a shoe is simply and expeditiously accomplished in the example disclosed, by withdrawal through the hand hole 27 which is of sufficient size for this purpose. The preferred manner of shoe removal consists in retracting the screw top 68 into the cylinder 61 until its end 69 is disposed within the cylinder. If desired, the complete stop device 60 may be removed. The cover plate or door 30 is next removed, carrying with it all of the hydraulic device 85 but the piston 92 and rod 94, these last two elements remaining attached to the shoe end 87. The sealed top portion 32 of chain drive housing 26 is then removed to permit of access to and removal of the pivotal connections 48 located near the upper end of the engine frame. When this is done, the shoe is free to be withdrawn from the casing by lowering it outwardly through the opening 27 in the manner illustrated in Fig. 2 wherein the shoe is shown in broken lines as at 125, in one stage of its removal. A reassembly of the shoe within the casing 26 is accomplished by reversing the described steps for removal thereof.

Since the shoe structures 34 and 35 are symmetrically arranged in opposed relation to the sides of chain 24, a substantially symmetrical chain configuration is attained; only a slight variation from true symmetry thereof being permitted by lateral shoe movements, the extent of shoe movement away from the chain being limited, of course, by the mechanical stop 60 or 107. The symmetrical chain configuration is maintained during all conditions of engine load torque and reversible operation of the chain drive, whereby to avoid any material angular variation in the phase relation of the connected crankshafts 19 and 20. The curvature of the chain shoes is predetermined to conform to the desired operative chain configuration, and to avoid excessive wear between the chain and shoe as well as to avoid any sharp changes in the passes of the chain between the sprockets 23.

As the engine load torque increases, it will appear evident from Fig. 2, that the curvature of the chain on the tension or pull side tends to straighten, approaching a straight line for infinite tension. The pressure applied to the shoes by the hydraulically operated devices is substantially constant during all conditions of chain operation, hence any tendency of the chain to straighten is opposed by the counterpressure exerted on the shoes by the oil operated devices. Since the chain 24 operates under an initial tension whereby an appreciable increase in tension effects only a very slight change in the phase relation of the connected crankshafts, with a correspondingly small unidirectional lateral shift or movement of the chain shoes 34 and 35, the symmetrical configuration of the chain 24 is substantially maintained during all conditions of forward and reverse chain operation.

While there is in this application specifically described one form which this invention may assume in practice, it will be understood that this form is shown for the purpose of illustrative convenience, and that the present invention may be modified and embodied in various forms with other type machines and devices without departing from the spirit or the intent of the present invention as defined by the appended claims.

I claim:

1. In a chain drive assembly for the purpose described, spaced shafts, sprockets carried by said shafts, a chain operatively connecting said sprockets, a chain shoe adapted for engagement with a portion of the chain, a pivoted support for said shoe, independent fluid pressure-operated devices, operatively associated respectively with said shoe and with said pivoted support, each of said devices being adapted for urging said shoe into tensioning engagement with the chain, and a device acting on said shoe, and adapted to limit chain-displacement thereof in one direction.

2. In a chain drive assembly of the type described including spaced shafts, sprockets on said shafts and a chain operatively connecting said sprockets, an elongate tensioning shoe for said chain, means supporting said shoe and permitting both pivotal and lateral displacement movement of said shoe relative to the chain, and a pair of fluid pressure-operated devices acting on said shoe near opposite ends thereof, adapted for yieldably retaining the shoe in tensioning engagement with the chain.

3. In a chain drive, a chain, sprockets connected by said chain, a pair of elongate shoe elements symmetrically arranged in engagement with opposite passes of said chain to provide a substantially symmetrical chain configuration, and chain tension regulating means operatively associated with the end portions of each of said shoe elements to maintain the said chain configuration independently of tension variations in said chain, said means including fluid-pressure actuated plungers and a common source of fluid under pressure for said plungers.

4. In a chain drive, a chain, sprockets connected by said chain, opposed, coacting chain shoes, means pivotally mounting each of said shoes for engagement with one pass of the chain, and fluid-pressure actuated means operatively associated with said shoes for damping chain whip and displacement of the shoes in response to changes in chain tension, said last named means comprising plungers pivotally connected to the opposite end portions of each chain shoe.

5. In an engine of the type described, and provided with a force-feed lubrication system, a chain drive constituting a part of the operative engine organization and including a chain, gear elements connected by said chain, elongate shoes symmetrically arranged for engaging opposite passes of the chain, and independently operable hydraulic pressure actuated means for constraining said shoes against the chain, said means being in fluid connection with the lubrication system of said engine.

6. In a power transmission assembly, spaced shafts, sprockets on said shafts, an endless chain connecting said sprockets, elongate chain shoes symmetrically arranged and adapted for engagement with opposite passes of the chain, swingably mounted suspension elements carrying said shoes, and means for urging said shoes with uniform pressure against the chain, said means including independently operable fluid-pressure actuated members associated with the end portions of each chain shoe and a common source of fluid under pressure for actuating said members.

7. In a chain drive assembly, a pair of vertically spaced shafts, a sprocket on each of said shafts, a chain operatively engaging said sprockets for connecting the shafts in driving relation, an elongate chain-tensioning element bearing against the chain, a suspension arm for said element, pivotally connected thereto near its upper end, a pivotal support for said suspension arm, and means acting on the tensioning element near opposite ends thereof for urging the tensioning element into lateral engagement with a portion of the chain between said sprockets.

8. In a chain drive assembly, spaced shafts, sprockets on said shafts, a chain connecting the sprockets, an elongate chain shoe adapted for lateral engagement with a portion of the chain, means pivotally supporting the chain shoe from one of its ends, and independently operable means connected with opposite end portions of said shoe, and adapted for urging said shoe into chain tensioning engagement with the chain.

9. In a chain drive assembly, spaced shafts, sprockets on said shafts, a chain connecting the sprockets, an elongate chain shoe adapted for lateral engagement with the chain, a pivoted suspension element for the shoe, independently operable pressure means acting on the shoe near opposite ends thereof for urging said shoe into tensioning engagement with the chain, and means engageable with the shoe between said pressure means for limiting movement of the shoe away from the chain.

10. In a chain drive of enclosed type, a chain, sprockets connected by said chain, a casing serving as an enclosure for said drive, a chain tensioning element movable to effect transverse displacement of one pass of the chain, a reciprocable indicating member carried by said casing and free of said chain tensioning element, and means for resiliently urging the member against said tensioning element so as to be freely reciprocable responsively to movements of said element, said member extending externally of the casing to provide an index of said chain displacement.

JAMES H. TAYLOR.